(12) United States Patent
Okamoto et al.

(10) Patent No.: US 10,906,237 B2
(45) Date of Patent: Feb. 2, 2021

(54) PRODUCTION METHOD OF THREE-DIMENSIONALLY SHAPED OBJECT

(71) Applicant: Seiko Epson Corporation, Tokyo (JP)

(72) Inventors: Eiji Okamoto, Matsumoto (JP); Akihiko Tsunoya, Okaya (JP)

(73) Assignee: Seiko Epson Corporation

( * ) Notice: Subject to any disclaimer, the term of this patent is extended or adjusted under 35 U.S.C. 154(b) by 226 days.

(21) Appl. No.: 16/222,018

(22) Filed: Dec. 17, 2018

(65) Prior Publication Data

US 2019/0184461 A1 Jun. 20, 2019

(30) Foreign Application Priority Data

Dec. 19, 2017 (JP) .................................. 2017-242710

(51) Int. Cl.
| | | |
|---|---|---|
| *B29C 64/165* | (2017.01) | |
| *B29C 64/336* | (2017.01) | |
| *B33Y 10/00* | (2015.01) | |

(52) U.S. Cl.
CPC .......... *B29C 64/165* (2017.08); *B29C 64/336* (2017.08); *B33Y 10/00* (2014.12)

(58) Field of Classification Search
CPC ............................ B29C 64/165; B29C 64/336
See application file for complete search history.

(56) References Cited

U.S. PATENT DOCUMENTS

| | | | | |
|---|---|---|---|---|
| 3,052,967 A | * | 9/1962 | Fischer ................ | B22F 3/1112 428/566 |
| 2011/0123382 A1 | * | 5/2011 | Hamman ............... | A61L 27/56 419/2 |
| 2015/0314530 A1 | * | 11/2015 | Rogren ................. | B33Y 30/00 264/131 |
| 2018/0104793 A1 | * | 4/2018 | Franke ................... | B24D 7/10 |
| 2019/0168300 A1 | * | 6/2019 | Gelbart ................ | B22F 3/008 |
| 2020/0114575 A1 | * | 4/2020 | Price ..................... | B22F 3/008 |

FOREIGN PATENT DOCUMENTS

JP 2010-065259 A 3/2010

* cited by examiner

*Primary Examiner* — Joseph S Del Sole
*Assistant Examiner* — Jerzi H Moreno Hernandez
(74) *Attorney, Agent, or Firm* — Harness, Dickey & Pierce, P.L.C.

(57) ABSTRACT

A production method of a three-dimensionally shaped object, includes a first layer forming step of forming a first layer by using a first composition containing first powder and binder, a second layer forming step of forming a second layer by using a second composition containing second powder, third powder, and binder, and a sintering step of sintering the first powder and the second powder. In a case where the first powder and the second powder are of the same material, difference in a contraction rate between the first layer and the second layer in the sintering step is reduced by matching a filling rate of the first powder in the first composition with a total filling rate of the second powder and the third powder in the second composition and matching an average particle diameter of the first powder with an average particle diameter of the second powder.

5 Claims, 12 Drawing Sheets

PRODUCTION METHOD OF THREE-DIMENSIONALLY SHAPED OBJECT

This application claims priority under 35 U.S.C. § 119 to Japanese Patent Application No. 2017-242710 filed on Dec. 19, 2017, the entire disclosure of which is expressly incorporated by reference herein.

BACKGROUND

1. Technical Field

The present invention relates to a production method of a three-dimensionally shaped object.

2. Related Art

Conventionally, various production methods of three-dimensionally shaped objects are used. Among these, there is a method of producing a three-dimensionally shaped object by forming a plurality of layers from a constituent material of a three-dimensionally shaped object.

For example, JP-A-2010-65259 discloses a method of producing a three-dimensionally shaped object by using powder that is a constituent material of a three-dimensionally shaped object. In the method, a three-dimensionally shaped object including a high-density portion and a low-density portion is formed by forming and solidifying a layer of a high-density shaped portion and then forming and solidifying a layer of a low-density shaped portion.

In the production method of a three-dimensionally shaped object disclosed in JP-A-2010-65259, in the case of producing the three-dimensionally shaped object including the high-density portion and the low-density portion, solidification of the high-density portion and solidification of the low-density portion are performed separately, and therefore the production efficiency is not good. Therefore, it is preferable to collectively solidify the high-density portion and the low-density portion. However, in the case of performing sintering for the solidification, when the three-dimensionally shaped object including the high-density portion and the low-density portion is collectively sintered by using a conventional production apparatus for a three-dimensionally shaped object, the three-dimensionally object is sometimes deformed in the collective sintering due to the difference in the contraction rate in the sintering between the high-density portion and the low-density portion.

SUMMARY

Therefore, an advantage of some aspects of the invention is to efficiently produce a three-dimensionally shaped object including a high-density portion and a low-density portion by collective sintering.

A production method of a three-dimensionally shaped object according to an aspect of the invention is a production method of a three-dimensionally shaped object for producing the three-dimensionally shaped object by laminating layers. The production method includes forming a first layer among the layers by using a first composition containing first powder and binder, forming a second layer among the layers by using a second composition containing second powder, third powder, and binder, the third powder being an organic material, and sintering the first powder and the second powder by heating a laminate including the first layer and the second layer. In a case where the first powder and the second powder are of the same material, difference in a contraction rate between the first layer and the second layer in the sintering is reduced by matching a filling rate of the first powder in the first composition with a total filling rate of the second powder and the third powder in the second composition and matching an average particle diameter of the first powder with an average particle diameter of the second powder.

According to this aspect, in the case where the first powder and the second powder are of the same material, the difference in the contraction rate between the first layer and the second layer in the sintering is reduced by matching the filling rate of the first powder in the first composition with the total filling rate of the second powder and the third powder in the second composition and matching the average particle diameter of the first powder with the average particle diameter of the second powder. As a result of this, a three-dimensionally shaped object including a high-density portion (first layer) and a low-density portion (second layer) can be collectively sintered.

A production method of a three-dimensionally shaped object according to another aspect of the invention is a production method of a three-dimensionally shaped object for producing the three-dimensionally shaped object by laminating layers. The production method includes forming a first layer among the layers by using a first composition containing first powder and binder, forming a second layer among the layers by using a second composition containing second powder, third powder, and binder, the third powder being an organic material, and sintering the first powder and the second powder by heating a laminate including the first layer and the second layer. In a case where the first powder and the second powder are of different materials, difference in a contraction rate between the first layer and the second layer in the sintering is reduced by matching a filling rate of the first powder in the first composition with a total filling rate of the second powder and the third powder in the second composition and determining an average particle diameter of the first powder and an average particle diameter of the second powder such that a relative density of an individually sintered body of the first powder and a relative density of an individually sintered body of the second powder are approximately equal.

According to this aspect, in the case where the first powder and the second powder are of different materials, the difference in the contraction rate between the first layer and the second layer in the sintering is reduced by matching the filling rate of the first powder in the first composition with the total filling rate of the second powder and the third powder in the second composition and determining the average particle diameter of the first powder and the average particle diameter of the second powder such that the relative density of the individually sintered body of the first powder and the relative density of the individually sintered body of the second powder are approximately equal. As a result of this, a three-dimensionally shaped object including a high-density portion (first layer) and a low-density portion (second layer) can be collectively sintered.

To be noted, "matching" and "approximately equal" refer to not only a case of being exactly the same but also a case of being substantially the same. Examples of these cases include a case where the difference in the filling rate is equal to or smaller than 3% (for example, 42% and 45%), a case where the difference in the average particle diameter is equal to or smaller than 20% (for example, 2 μm and 2.5 μm or 4 μm and 5 μm), and a case where the difference in the ratio of relative density is equal to or smaller than 2%. In addition, for example, d50 can be adopted as the "average particle diameter".

According to a production method of a three-dimensionally shaped object of another aspect of the invention, a cell structure portion constituted by the second layer is formed in the laminate, and a pipe portion constituted by the first layer is formed in the cell structure portion.

According to this aspect, the cell structure portion constituted by the second layer is formed in the laminate, and the pipe portion constituted by the first layer is formed in the cell structure portion. That is, the cell structure portion has a low thermal conductivity as a result of being formed in a low density, and a portion corresponding to the first layer in which the pipe portion is formed has a high thermal conductivity as a result of being formed in a high density. Therefore, by employing a configuration in which, for example, a heat source is in contact with the portion corresponding to the first layer and the pipe portion is cooled by flowing cooling water or the like in the pipe portion, the laminate can be used as a heat sink or the like of a high performance that can efficiently suppress transfer of heat from the cell structure portion (portion corresponding to the second layer) to the surroundings.

According to a production method of a three-dimensionally shaped object of another aspect of the invention, in the laminate, a base portion and a columnar portion extending from the base portion are formed from the second layer, and a shape partially inserted in the columnar portion from an opposite side to the base portion is formed from the first layer.

According to this aspect, in the laminate, a base portion and a columnar portion extending from the base portion are formed from the second layer, and a shape partially inserted in the columnar portion from an opposite side to the base portion is formed from the first layer. That is, the base portion has a low thermal conductivity as a result of being formed in a low density, the opposite side (portion corresponding to the first layer) to the base portion has a high thermal conductivity as a result of being formed in a high density, and a space portion is defined around the columnar portion in a region between the base portion and the opposite side to the base portion. Therefore, by employing a configuration in which, for example, a heat source is in contact with the opposite side (portion corresponding to the first layer) to the base portion and the base portion is cooled by cooling water or the like, the laminate can be used for a loop heat pipe (LHP) or the like of high performance in which the cooling water is caused to permeate to the columnar portion side from the base portion corresponding to the second layer while effectively suppressing transfer of heat to the base portion side and latent heat is absorbed by evaporating the cooling water in the space portion around the columnar portion.

According to a production method of a three-dimensionally shaped object of another aspect of the invention, the laminate is formed such that a presence ratio of the first layer and the second layer varies in at least one of a lamination direction of the first layer and the second layer and a crossing direction crossing the lamination direction.

According to this aspect, since the laminate is formed such that the presence ratio of the first layer and the second layer varies in at least one of the lamination direction and the crossing direction, gradient of thermal conductivity can be generated in the laminate in accordance with the application or the like of the three-dimensionally shaped object.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below with reference to drawings.

FIGS. 1 to 4 are each a schematic configuration diagram illustrating a configuration of a production apparatus of the three-dimensionally shaped object according to an embodiment of the invention.

Figure 1:
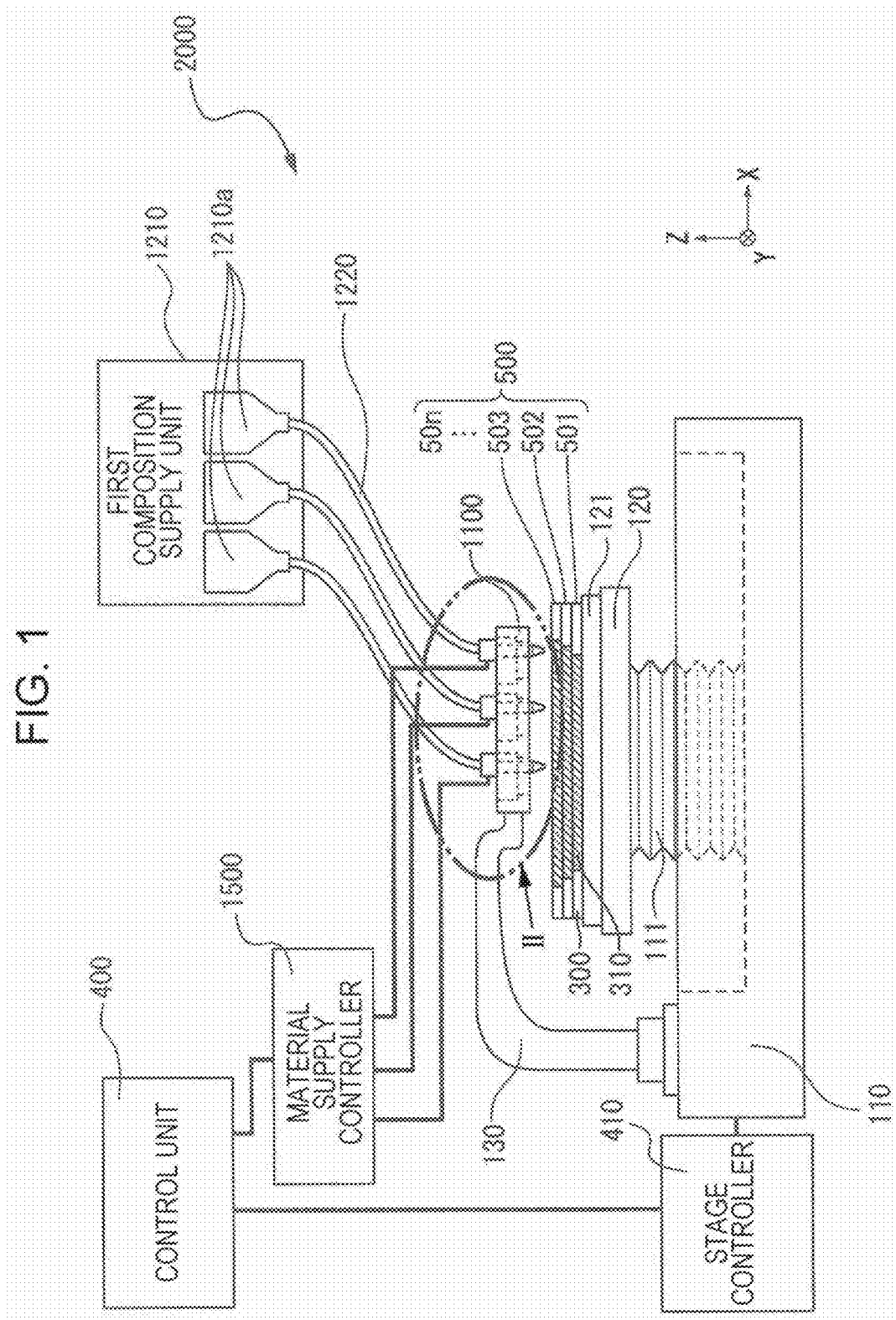
FIG. 1 is a schematic configuration diagram illustrating a configuration of a production apparatus of a three-dimensionally shaped object according to an embodiment of the invention.
Figure 2:
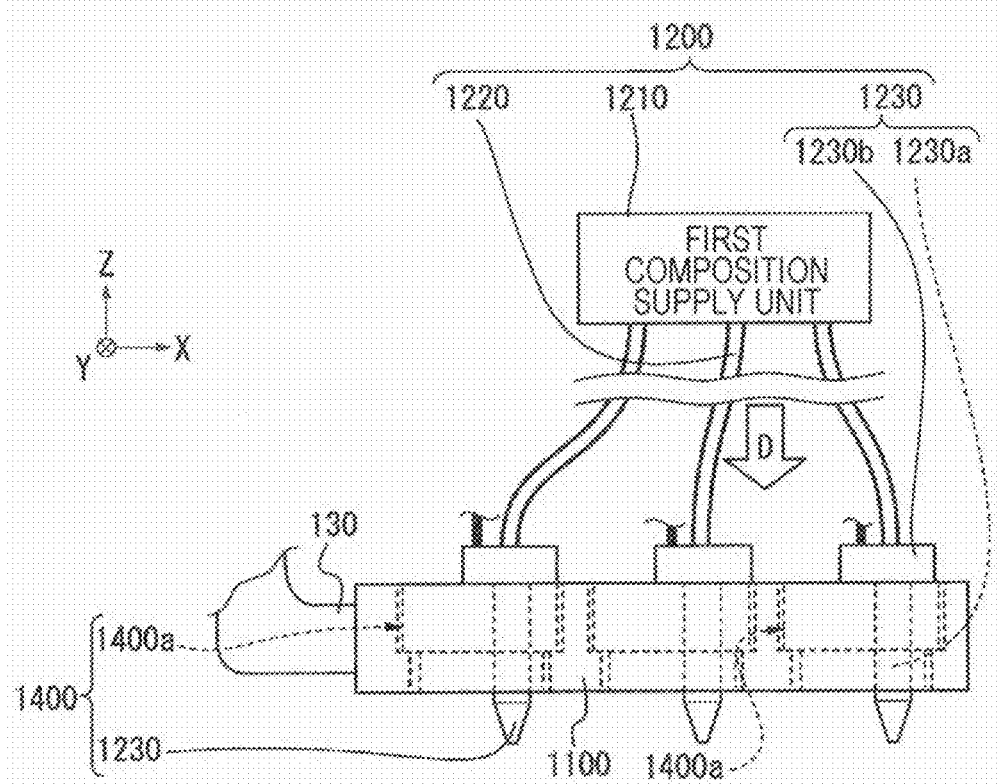
FIG. 2 is an enlarged view of a portion II illustrated in FIG. 1.

Here, a production apparatus of a three-dimensionally shaped object according to the present embodiment includes two kinds of material supply portions (head bases). FIGS. 1 and 2 each illustrate only one of these material supply portions (material supply portion that supplies a first composition containing first powder and binder). In addition, FIGS. 3 and 4 each illustrate only the other of the material supply portions (material supply portion that supplies a second composition containing second powder, third powder which is an organic material, and binder).

To be noted, "three-dimensional shaping" includes, for example, forming a flat plate shape, that is, a so-called two-dimensional shape that has thickness. In addition, "support" refers to not only a case of supporting from below but also a case of supporting from the side and sometimes a case of supporting from above.

In addition, the first composition and the second composition are each a paste (fluid material) for three-dimensional shaping containing powder particles that constitutes a three-dimensionally shaped object, a solvent, and binder soluble in the solvent. Further, the first composition corresponds to a constituent material that forms a high-density portion of a laminate of a three-dimensionally shaped object, and the second composition corresponds to a constituent material that forms a low-density portion of the laminate of the three-dimensionally shaped object. However, the first composition and the second composition are not limited to such constituent materials of the three-dimensionally shaped object, and compounds that are solid of filament shapes or pellet shapes at a normal temperature and take a fluid state when heated may be used.

A production apparatus 2000 (hereinafter referred to as a forming apparatus 2000) of a three-dimensionally shaped object illustrated in FIGS. 1 and 3 includes a base 110, a driving apparatus 111 provided on the base 110 and serving as a driving portion, and a stage 120 provided so as to be movable in X, Y, and Z directions that are illustrated or be capable of driving in a rotation direction about a Z axis by the driving apparatus 111.

Further, as illustrated in FIGS. 1 and 2, the forming apparatus 2000 includes a head base support portion 130 one end portion of which is fixed to the base 110 and in the other end of which a head base 1100 holding a plurality of head units 1400 each including a first composition ejecting portion 1230 that ejects the first composition is held and fixed.

Figure 3:
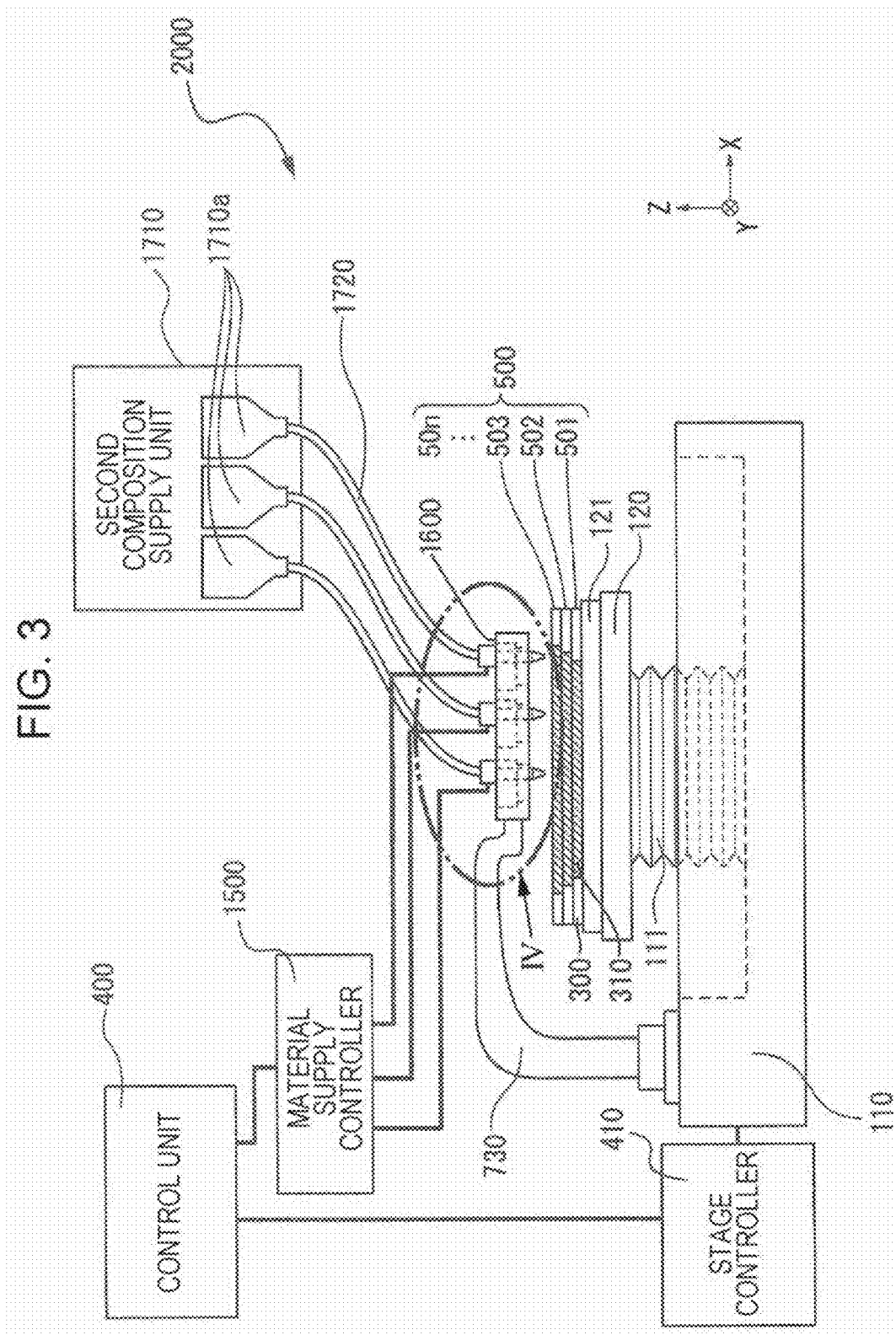
FIG. 3 is a schematic configuration diagram illustrating a configuration of a production apparatus of a three-dimensionally shaped object according to an embodiment of the invention.
Figure 4:
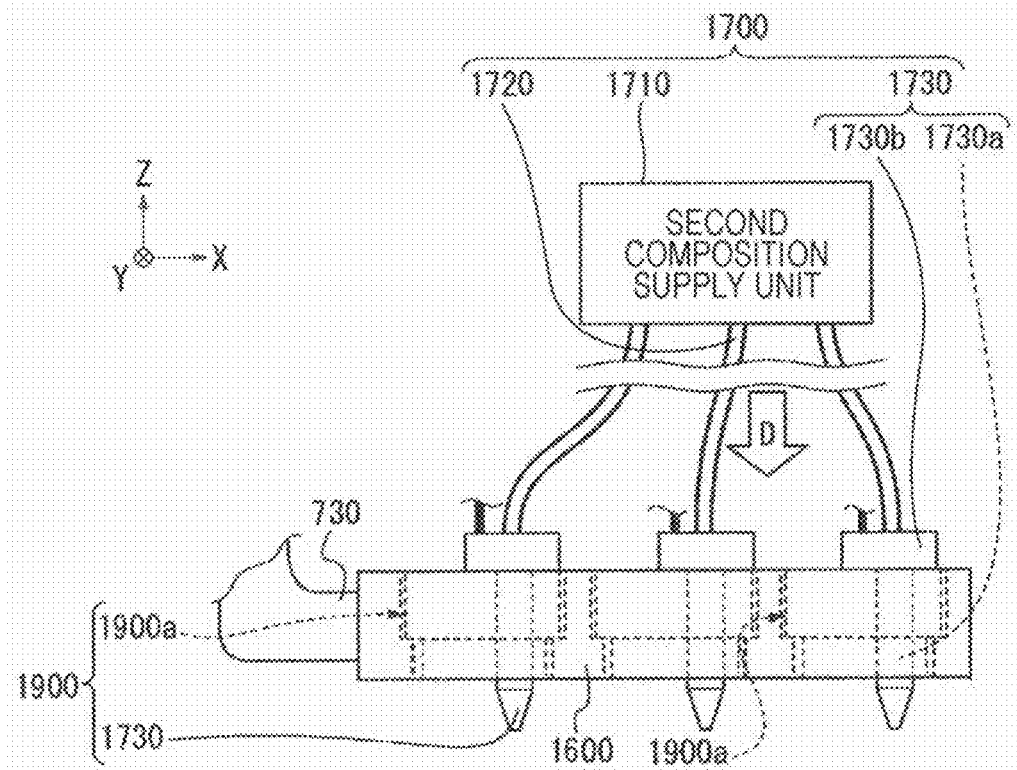
FIG. 4 is an enlarged view of a portion IV illustrated in FIG. 3.

In addition, as illustrated in FIGS. 3 and 4, the forming apparatus 2000 includes a head base support portion 730 one end portion of which is fixed to the base 110 and in the other end of which a head base 1600 holding a plurality of head units 1900 each including a second composition ejecting portion 1730 that ejects the second composition is held and fixed.

Here, the head base 1100 and the head base 1600 are arranged in parallel in an X-Y plane.

To be noted, the first composition ejecting portions 1230 and the second composition ejecting portions 1730 have similar configurations. However, the configuration is not limited to this.

Layers 501, 502, and 503 are formed on the stage 120 in the course of formation of a three-dimensionally shaped object 500 (laminate of a three-dimensionally shaped object). In the formation of the three-dimensionally shaped object 500, irradiation of thermal energy may be performed by an electromagnetic wave irradiation portion or the like. In the case of such a configuration, a sample plate 121 having heat resistance may be used for protection from heat from the stage 120, and the three-dimensionally shaped object 500 may be formed on the sample plate 121. The sample plate 121 of the present embodiment is a metal plate that is strong and easy to produce. However, by using, for example, a ceramic plate as the sample plate 121, high heat resistance can be obtained. Further, since the ceramic plate has low reactivity with constituent materials (first composition and second composition) of the three-dimensionally shaped object 500 that are to be degreased or sintered, change of quality of the three-dimensionally shaped object 500 can be prevented. To be noted, although the three layers 501, 502 and 503 are shown as an example in FIGS. 1 and 3 for the sake of convenience of description, layers are laminated until forming a desired shape of the three-dimensionally shaped object 500 (up to a layer 50n of FIGS. 1 and 3).

Here, the layers 501, 502, 503, . . . 50n are each constituted by a first layer 310 formed from the first composition ejected from the first composition ejecting portions 1230 and a second layer 300 formed from the second composition ejected from the second composition ejecting portions 1730.

In addition, FIG. 2 is a conceptual enlarged view of a portion II illustrating the head base 1100 shown in FIG. 1. As illustrated in FIG. 2, the head base 1100 holds the plurality of head units 1400. Each head unit 1400 is constituted by the first composition ejecting portion 1230 provided in a first composition supply apparatus 1200 and a holding jig 1400a holding the first composition ejecting portion 1230. Details thereof will be described later. The first composition ejecting portion 1230 includes an ejecting nozzle 1230a and an ejection driving portion 1230b that causes the ejecting nozzle 1230a to eject the first composition by a material supply controller 1500.

FIG. 4 is a conceptual enlarged view of a portion IV illustrating the head base 1600 shown in FIG. 3. As illustrated in FIG. 4, the head base 1600 holds the plurality of head units 1900. Each head unit 1900 is constituted by the second composition ejecting portion 1730 provided in a second composition supply apparatus 1700 and a holding jig 1900a holding the second composition ejecting portion 1730. The second composition ejecting portion 1730 includes an ejecting nozzle 1730a and an ejection driving portion 1730b that causes the ejecting nozzle 1730a to eject the second composition by the material supply controller 1500.

As illustrated in FIGS. 1 and 2, the first composition ejecting portion 1230 is connected, via a supply tube 1220, to a first composition supply unit 1210 accommodating the first composition in correspondence with each of the head units 1400 held by the head base 1100. Further, a predetermined first composition is supplied from the first composition supply unit 1210 to the first composition ejecting portion 1230. In the first composition supply unit 1210, the first composition that is a constituent material of a high-density portion of the three-dimensionally shaped object 500 that is to be shaped by the forming apparatus 2000 according to the present embodiment is accommodated in first composition accommodating portions 1210a, and respective first composition accommodating portions 1210a are connected to respective first composition ejecting portions 1230 via supply tubes 1220. As described above, by providing individual first composition accommodating portions 1210a, first compositions of a plurality of different kinds can be supplied from the head base 1100.

As illustrated in FIGS. 3 and 4, the second composition ejecting portion 1730 is connected, via a supply tube 1720, to a second composition supply unit 1710 accommodating the second composition in correspondence with each of the head units 1900 held by the head base 1600. Further, a predetermined second composition is supplied from the second composition supply unit 1710 to the second composition ejecting portion 1730. In the second composition supply unit 1710, the second composition that is a constituent material of a low-density portion of the three-dimensionally shaped object 500 that is to be shaped by the forming apparatus 2000 according to the present embodiment is accommodated in second composition accommodating portions 1710a, and respective second composition accommodating portions 1710a are connected to respective second composition ejecting portions 1730 via supply tubes 1720. As described above, by providing individual second composition accommodating portions 1710a, second compositions of a plurality of different kinds can be supplied from the head base 1600.

To be noted, details of the three-dimensional shaping pastes serving as constituent materials (first composition and second composition) used in the forming apparatus 2000 of the present embodiment will be described later.

The forming apparatus 2000 includes a control unit 400 serving as a control portion that controls, on the basis of, for example, shaping data of the three-dimensionally shaped object 500 output from a data output apparatus such as a personal computer that is not illustrated, the stage 120, the first composition ejecting portions 1230 included in the first composition supply apparatus 1200, and the second composition ejecting portions 1730 included in the second composition supply apparatus 1700 that are described above. The control unit 400 also functions as a control portion that performs control such that the stage 120 and the first composition ejecting portions 1230 move and operate in a cooperated manner and that the stage 120 and the second composition ejecting portions 1730 move and operate in a cooperated manner.

Regarding the stage 120 movably provided on the base 110, on the basis of a control signal from the control unit 400, signals for controlling start and stop of movement, a direction, amount, and speed of movement, and so forth of the stage 120 are generated by a stage controller 410 and transmitted to the driving apparatus 111 provided on the base 110, and the stage 120 moves in the X, Y, and Z directions that are illustrated. Regarding the first composition ejecting portions 1230 included in the head unit 1400, on the basis of a control signal from the control unit 400, signals for controlling an amount of ejection of material from the ejecting nozzles 1230a by the ejection driving portions 1230b included in the first composition ejecting portions 1230 are generated by a material supply controller 1500, and the first composition of a predetermined amount is ejected through the ejecting nozzles 1230a in accordance with the generated signals.

Similarly, regarding the second composition ejecting portions 1730 included in the head unit 1900, on the basis of a control signal from the control unit 400, signals for controlling an amount of ejection of material from the ejecting nozzles 1730a by the ejection driving portions 1730b included in the second composition ejecting portions 1730 are generated by the material supply controller 1500, and the second composition of a predetermined amount is ejected through the ejecting nozzles 1730a in accordance with the generated signals.

Next, the head unit 1400 will be described in further detail. To be noted, the head unit 1900 has a similar configuration to the head unit 1400. Therefore, detailed description of the configuration of the head unit 1900 will be omitted.

Figure 5:
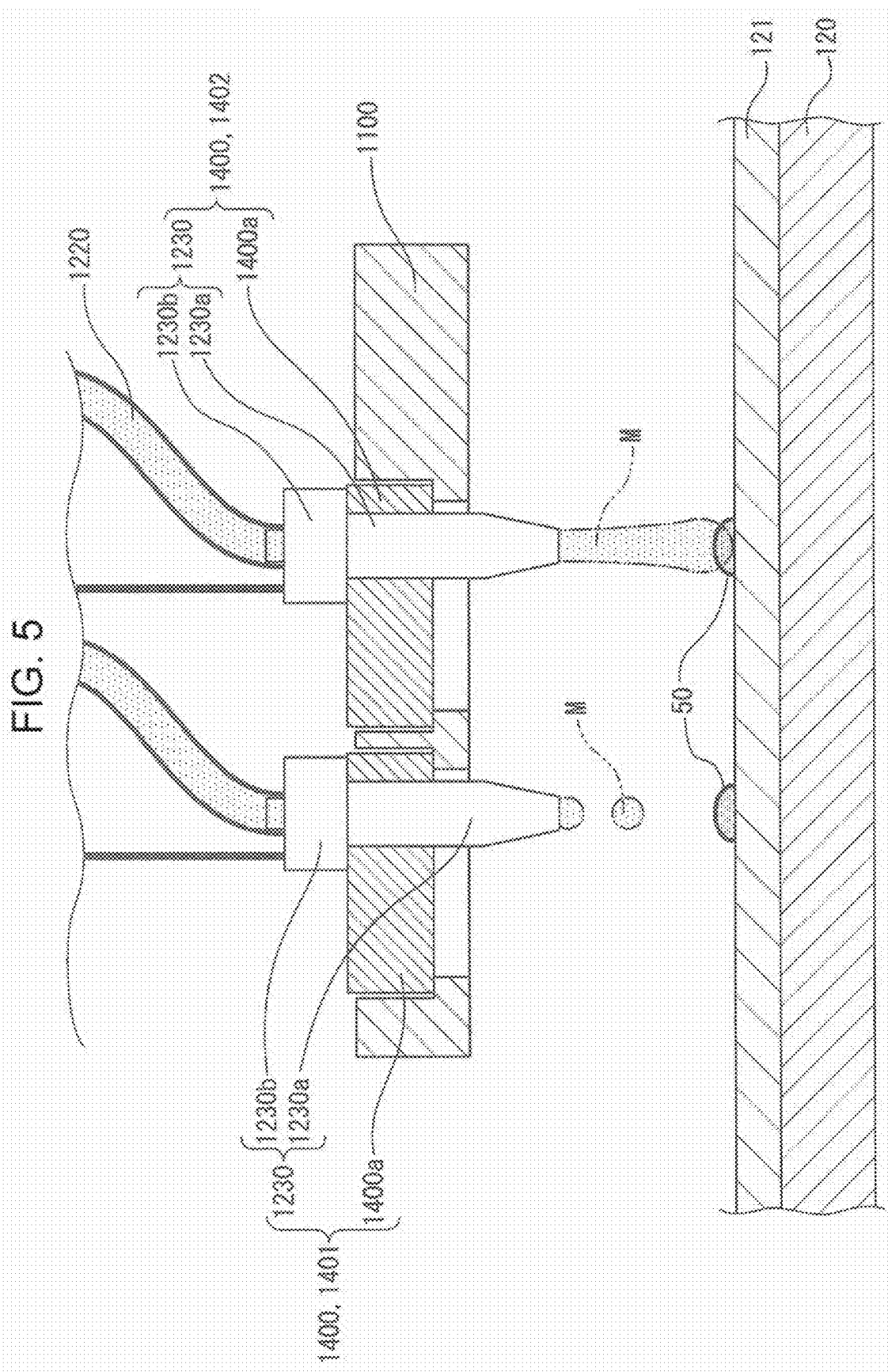
FIG. 5 is a schematic perspective view of a head base according to an embodiment of the invention.
Figure 6:
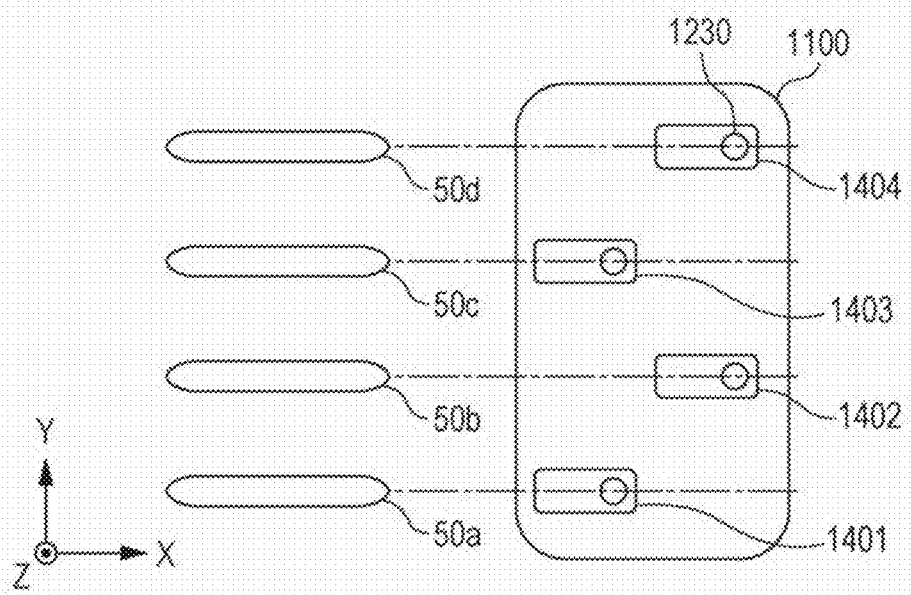
FIG. 6 is a plan view for conceptually describing a relationship between the arrangement of head units and a formation configuration of a three-dimensionally shaped object according to an embodiment of the invention.
Figure 7:
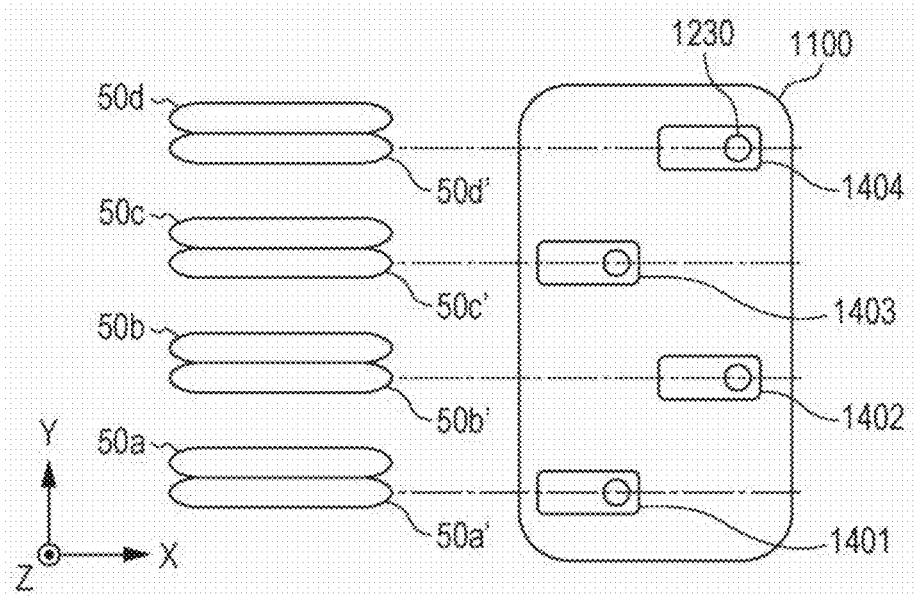
FIG. 7 is a plan view for conceptually describing a relationship between the arrangement of head units and a formation configuration of a three-dimensionally shaped object according to an embodiment of the invention.
Figure 8:
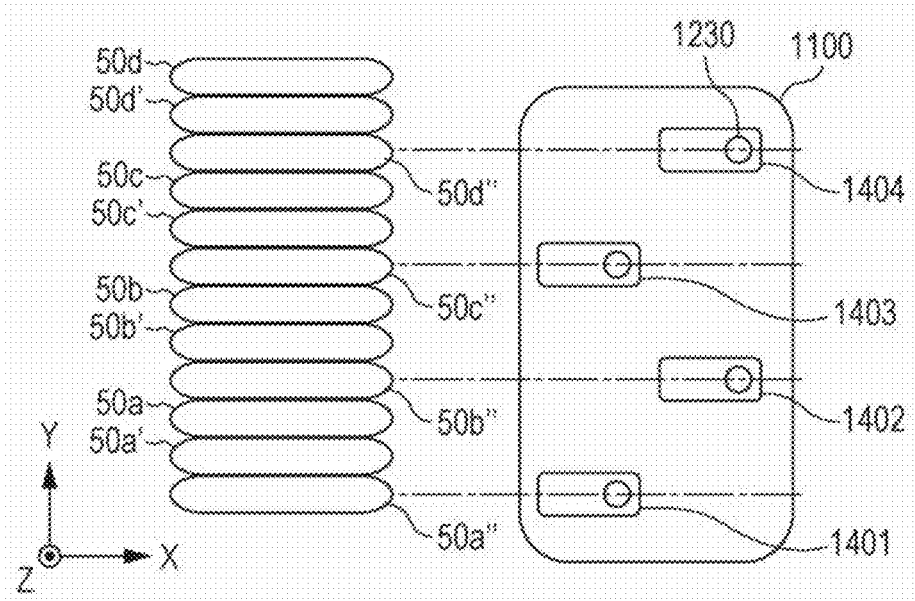
FIG. 8 is a plan view for conceptually describing a relationship between the arrangement of head units and a formation configuration of a three-dimensionally shaped object according to an embodiment of the invention.

FIGS. 5 to 8 each illustrate an example of how the head units 1400 and the first composition ejecting portions 1230 are held by the head base 1100. Among these, FIGS. 6 to 8 are each an external view of the head base 1100 as viewed from an arrow D direction shown in FIG. 2.

As illustrated in FIG. 5, the head base 1100 holds the plurality of head units 1400 via unillustrated fixing portions. In addition, as illustrated in FIGS. 6 to 8, the head units 1400 in the head base 1100 of the forming apparatus 2000 according to the present embodiment are constituted by four units of a head unit 1401 in the first row, a head unit 1402 in the second row, a head unit 1403 in the third row, and a head unit 1404 in the fourth row, from the lower side in the figures, arranged in a staggered manner (alternately arranged). As illustrated in FIG. 6, constituent layer constituting portions 50 (constituent layer constituting portions 50a, 50b, 50c, and 50d) are formed by causing each head unit 1400 to eject the constituent material (first composition) while moving the stage 120 in the X direction with respect to the head base 1100. A forming procedure of the constituent layer constituting portions 50 will be described later. Here, layers of the constituent layer constituting portions 50 formed by the ejection from the first composition ejecting portions 1230 correspond to the first layer 310 (see FIG. 1), and layers of the constituent layer constituting portions 50 formed by the ejection from the second composition ejecting portions 1730 correspond to the second layer 300 (see FIG. 3).

To be noted, although not illustrated, the first composition ejecting portions 1230 respectively provided in the head units 1401 to 1404 are respectively connected to the first composition supply unit 1210 by the supply tubes 1220 via the ejection driving portions 1230b.

As illustrated in FIG. 5, the first composition ejecting portion 1230 ejects a material M that is a constituent material (paste-like fluid material) of the three-dimensionally shaped object 500 onto the sample plate 121 mounted on the stage 120 from the ejecting nozzle 1230a. For the head unit 1401, an ejection configuration in which the material M is ejected as droplets is exemplified, and for the head unit 1402, an ejection configuration in which the material M is supplied as a continuous body is exemplified. The ejection configuration of the material M may be either of the droplet configuration and the continuous configuration, and the present embodiment will be described with the configuration in which the material M is ejected as droplets.

The material M ejected as droplets from the ejecting nozzle 1230a drops substantially in the gravity direction and hit the sample plate 121. The stage 120 moves, and the material M that has hit the sample plate 121 forms the constituent layer constituting portions 50. These constituent layer constituting portions 50 as a whole are formed as the first layer 310 (see FIG. 1) of the three-dimensionally shaped object 500 to be formed on the sample plate 121.

Next, a forming procedure of the constituent layer constituting portions 50 will be described with reference to FIGS. 6 to 8 and FIGS. 9 and 10.

FIGS. 6 to 8 are each a plan view for conceptually describing a relationship between the arrangement of the head units 1400 and a formation configuration of the constituent layer constituting portions 50 according to the present embodiment. Further, FIGS. 9 and 10 are each a side view conceptually illustrating the formation configuration of the constituent layer constituting portions 50.

First, when the stage 120 moves in a +X direction, the material M is ejected as droplets from the plurality of ejecting nozzles 1230a, thus the material M is disposed at predetermined positions on the sample plate 121, and the constituent layer constituting portions 50 are formed.

Figure 9:
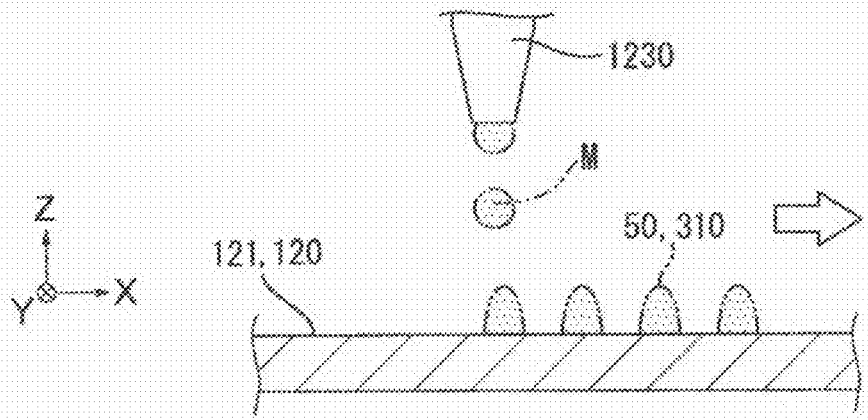
FIG. 9 is a schematic diagram for conceptually describing a formation configuration of a three-dimensionally shaped object.

More specifically, as illustrated in FIG. 9, the plurality of ejecting nozzles 1230a are caused to dispose the material M at predetermined positions on the sample plate 121 at constant intervals while moving the stage 120 in the +X direction.

Figure 10:
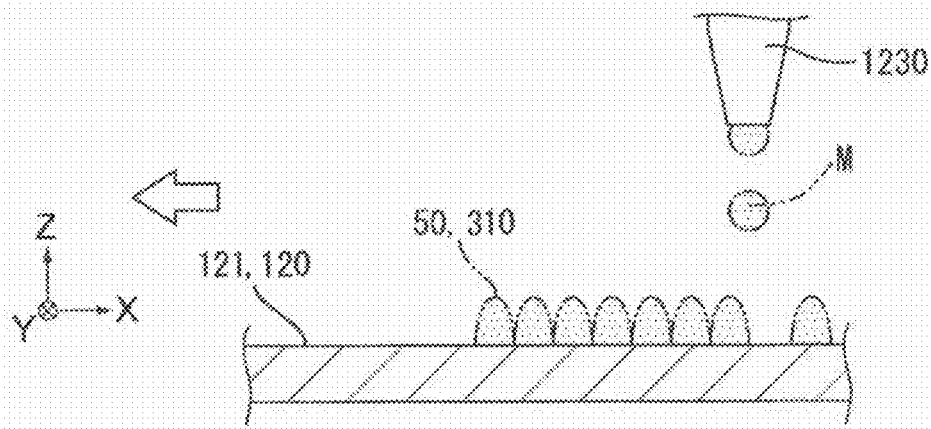
FIG. 10 is a schematic diagram for conceptually describing a formation configuration of a three-dimensionally shaped object.

Next, as illustrated in FIG. 10, the plurality of ejecting nozzles 1230a are caused to dispose the material M while moving the stage 120 in a −X direction so as to fill voids between the material M disposed at the constant intervals.

However, a configuration in which the plurality of ejecting nozzles 1230a are caused to dispose the material M at predetermined positions on the sample plate 121 while moving the stage 120 in the +X direction such that the constituent layer constituting portions 50 overlap one another (with no interval) (not a configuration in which the constituent layer constituting portions 50 are formed in reciprocal movement of the stage 120 in the X direction but a configuration in which the constituent layer constituting portions 50 are formed in one-way movement of the stage 120 in the X direction) may be employed.

By forming the constituent layer constituting portions 50 in the manner described above, constituent layer constituting portions 50 (constituent layer constituting portions 50a, 50b, 50c, and 50d) corresponding to one line (first line in the Y direction) of each of the head units 1401, 1402, 1403, and 1404 are formed as illustrated in FIG. 6.

Next, the head base 1100 is moved in a −Y direction so as to form constituent layer constituting portions 50' (constituent layer constituting portions 50a', 50b', 50c', an 50d') of the second line in the Y direction of each of the head units 1401, 1402, 1403, and 1404. Regarding the amount of movement, the head base 1100 is moved in the −Y direction by a pitch of P/n (n is a natural number) when P represents a pitch between nozzles. In the present embodiment, description will be given assuming that n is 3.

By performing an operation similar to what has been described above as illustrated in FIGS. 9 and 10, the constituent layer constituting portions 50' (constituent layer constituting portions 50a', 50b', 50c', and 50d') of the second line in the Y direction illustrated in FIG. 7 are formed.

Next, the head base 1100 is moved in the −Y direction so as to form constituent layer constituting portions 50" (constituent layer constituting portions 50a", 50b", 50c", an 50d") of the third line in the Y direction of each of the head units 1401, 1402, 1403, and 1404. Regarding the amount of movement, the head base 1100 is moved in the −Y direction by a pitch of P/3.

By performing an operation similar to what has been described above as illustrated in FIGS. 9 and 10, the constituent layer constituting portions 50" (constituent layer constituting portions 50a", 50b", 50c", and 50d") of the third line in the Y direction illustrated in FIG. 8 are formed, and thus the first layer 310 can be obtained.

In addition, as the material M ejected from the first composition ejecting portions 1230, one or more of the head units 1401, 1402, 1403, and 1404 may eject and supply a first composition different from the first composition ejected and supplied from the other head units. Therefore, by using the forming apparatus 2000 according to the present embodiment, a three-dimensionally shaped object formed from materials of different kinds can be obtained.

To be noted, in the layer 501 that is formed first, the second layer 300 can be formed in a similar manner by ejecting the second composition from the second composition ejecting portions 1730 before or after forming the first layer 310 as described above. Then, the first layer 310 and the second layer 300 can be formed in a similar manner also when forming the layers 502, 503, . . . 50n on the layer 501. To be noted, at least one of the layers 501, 502, 503, . . . 50n may be constituted solely by one of the first layer 310 and the second layer 300.

The number and arrangement of the head units 1400 and 1900 provided in the forming apparatus 2000 according to the present embodiment described above are not limited to the number and arrangement described above. This is exemplified by FIGS. 11 and 12 that are schematic diagrams illustrating examples of other arrangements of the head units 1400 disposed in the head base 1100.

Figure 11:
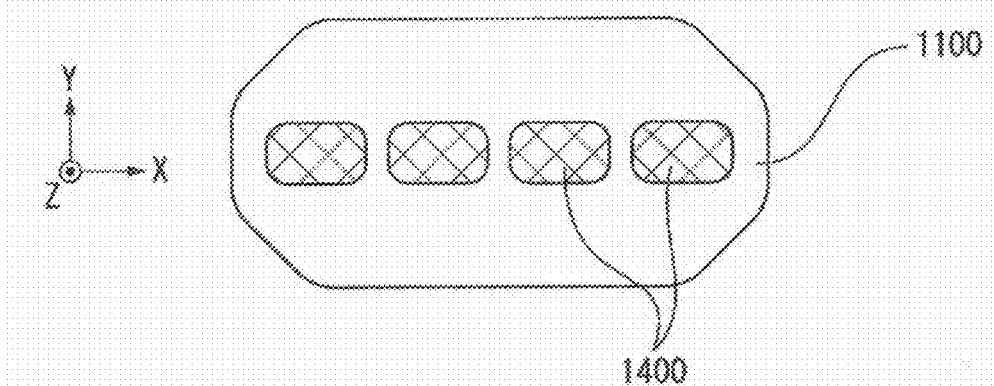
FIG. 11 is a schematic diagram illustrating an example of another arrangement of head units disposed in a head base.
Figure 12:
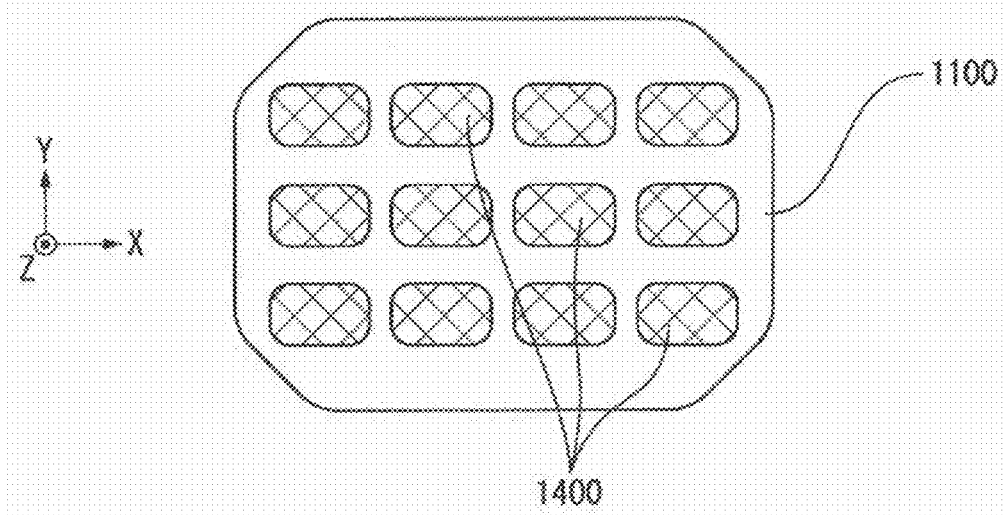
FIG. 12 is a schematic diagram illustrating an example of another arrangement of head units disposed in a head base.

FIG. 11 illustrates a configuration in which the plurality of head units 1400 are arranged in the head base 1100 in the X axis direction. FIG. 12 illustrates a configuration in which the plurality of head units 1400 are arranged in the head base 1100 in a lattice shape. To be noted, the number of head units is not limited to the illustrated examples in either case.

Next, the pastes for three-dimensional shaping respectively serving as the first composition and the second composition of the present embodiment will be described in detail.

As the first powder of the first composition and the second powder of the second composition, for example, single powders of magnesium (Mg), iron (F), cobalt (Co), chromium (Cr), aluminum (Al), titanium (Ti), copper (Cu), and nickel (Ni), and mixture powders such as alloys (maraging steel, stainless steel, cobalt chromium molybdenum, titanium alloy, nickel alloy, aluminum alloy, cobalt alloy, and cobalt chromium alloy) containing one or more of these metals can be used. In addition, as the third powder of the second composition, general-purpose engineering plastics such as polyamide, polyacetal, polycarbonate, modified polyphenylene ether, polybutylene terephthalate, and polyethylene terephthalate can be used. Further, single powders or mixture powders of organic materials, for example, engineering plastics (resins) such as polysulfone, polyethersulfone, polyphenylene sulfide, polyarylate, polyimide, polyamide-imide, polyetherimide, and polyether ether ketone can be used. Paste-like mixture materials containing these powders, solvents, and binders can be used as the first composition and the second composition.

As described above, the first composition and the second composition are not particularly limited, and metals other than the metals described above, ceramics, and so forth can be used as the first powder and the second powder. In addition, silicon dioxide, titanium dioxide, aluminum oxide, zirconium oxide, and so forth can be preferably used.

Examples of the solvent include water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; and ionic liquids such as tetraalkylammonium acetate (for example, tetrabutylammonium acetate), and one or more selected from these can be used in combination.

As the binder, for example, acrylic resin, epoxy resin, silicone resin, cellulose-based resin, or other synthetic resin, or polylactic acid (PLA), polyamide (PA), polyphenylene sulfide (PPS), or other thermoplastic resin can be used.

Next, an example of a production method of a three-dimensionally shaped object performed by using the forming apparatus 2000 described above will be described with reference to a flowchart.

Figure 13:
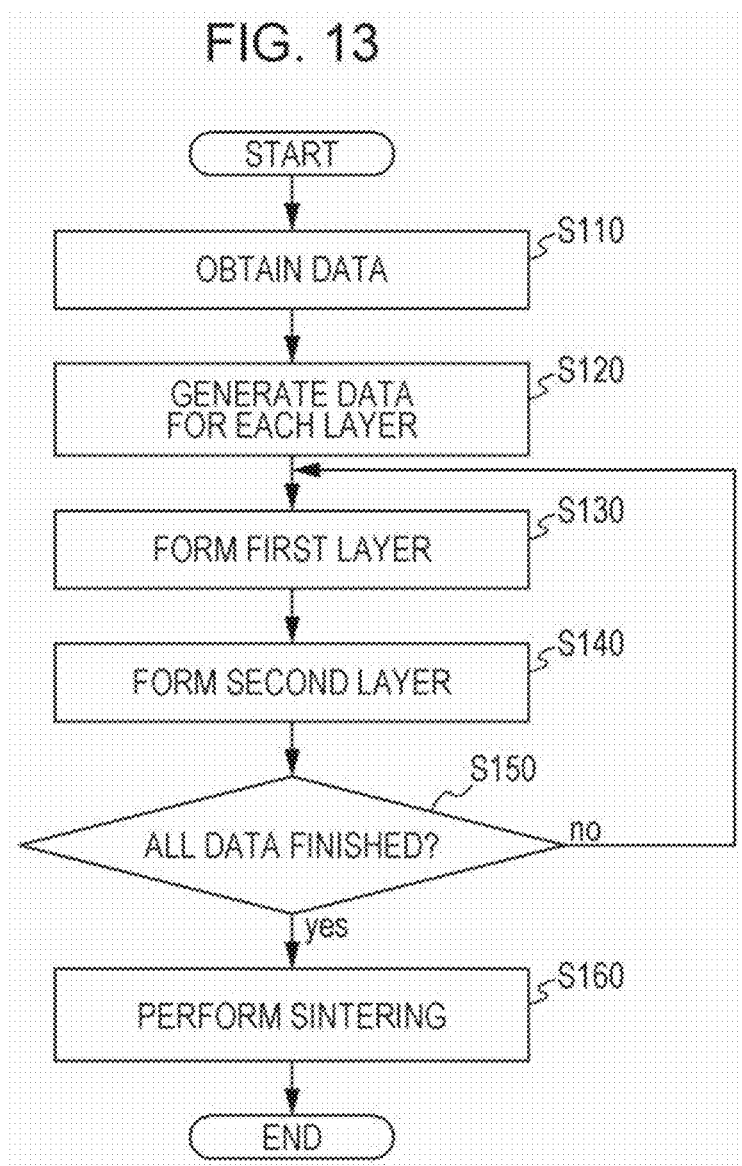
FIG. 13 is a flowchart of a production method of a three-dimensionally shaped object according to an embodiment of the invention.

FIG. 13 is a flowchart of a production method of a three-dimensionally shaped object according to the present embodiment.

As illustrated in FIG. 13, in the production method of a three-dimensionally shaped object according to the present embodiment, first, data of the three-dimensionally shaped object 500 is obtained in step S110. More specifically, data representing the shape of the three-dimensionally shaped object 500 is obtained from, for example, an application program or the like executed in the personal computer.

Next, in step S120, data of each layer is created (generated) by the control of the control unit 400. More specifically, the data representing the shape of the three-dimensionally shaped object 500 is sliced in accordance with the shaping resolution in the Z direction, and bitmap data (section data) is generated for each section.

Next, in a first layer forming step of step S130, by the control of the control unit 400 and on the basis of the section data generated in step S120, the first composition is ejected from the first composition ejecting portions 1230, and thus the constituent layer constituting portions 50 (first layer 310) based on the section data are formed.

Next, in a second layer forming step of step S140, by the control of the control unit 400 and on the basis of the section data generated in step S120, the second composition is ejected from the second composition ejecting portions 1730, and thus the constituent layer constituting portions 50 (second layer 300) based on the section data are formed.

To be noted, the order of the first layer forming step of step S130 and the second layer forming step of step S140 may be reversed.

Then, in step S150, by the control of the control unit 400, steps S130 to S150 are repeated until shaping of the laminate of the three-dimensionally shaped object 500 based on the bitmap data corresponding to each layer generated in step S120 is completed.

Then, in a sintering step of step S160, the laminate of the three-dimensionally shaped object 500 formed in the steps described above is heated in, for example, an unillustrated thermostat chamber, and thus the first powder in the first composition and the second powder in the second composition are sintered. To be noted, a degreasing step of degreasing the laminate of the three-dimensionally shaped object 500 formed in the steps described above may be provided before this sintering step.

Then, when step S160 is finished, the production method of the three-dimensionally shaped object of the present embodiment is finished.

As described above, the production method of the three-dimensionally shaped object of the present embodiment is a production method of a three-dimensionally shaped object in which the three-dimensionally shaped object 500 is produced by laminating the layers 501, 502, 503, . . . 50n, and includes a first layer forming step (step S130) of forming the first layer 310 among the layers 501, 502, 503, . . . 50n by using the first composition containing the first powder and the binder, a second layer forming step (step S140) of forming the second layer 300 among the layers 501, 502, 503, . . . 50n by using the second composition containing the second powder and the binder, and a sintering step (step S160) of sintering the first powder and the second powder by heating the laminate including the first layer 310 and the second layer 300.

Further, in the production method of a three-dimensionally shaped object according to the present embodiment, in the case where the first powder in the first composition and the second powder in the second composition are of the same material, the difference in the contraction rate between the first layer and the second layer in the sintering step of step S150 is reduced by matching the filling rate of the first powder in the first composition with the total filling rate of the second powder and the third powder in the second composition and matching the average particle diameter of the first powder with the average particle diameter of the second powder. Specifically, a user selects the first powder and the second powder such that the average particle diameter of the first powder and the average particle diameter of the second powder are approximately equal, and adjusts the compositions of the first composition and the second composition such that the filling rate of the first powder in the first composition and the total filling rate of the second powder and the third powder in the second composition are approximately equal.

In contrast, in the case where the first powder in the first composition and the second powder in the second composition are of different materials, the difference in the contraction rate between the first layer 310 and the second layer 300 in the sintering step of step S160 is reduced by matching the filling rate of the first powder in the first composition with the total filling rate of the second powder and the third powder in the second composition and determining the average particle diameter of the first powder and the average particle diameter of the second powder such that the relative density of an individually sintered body of the first powder and the relative density of an individually sintered body of the second powder are approximately equal. The specific method thereof will be described later.

In the case where the first powder and the second powder are of the same material, the difference in the contraction rate between the first layer 310 and the second layer 300 in the sintering step can be reduced by matching the filling rate of the first powder in the first composition with the total filling rate of the second powder and the third powder in the second composition and matching the average particle diameter of the first powder with the average particle diameter of the second powder. This is because, although, in the case where the constituent materials (first powder and second powder) of the three-dimensionally shaped object 500 are the same, the contraction tends to be greater when the filling rates of the particles thereof are smaller and when particles of smaller particle diameters are used due to disappearance of other components caused by sintering, the degree of contract can be equalized by using particles of the same particle diameters for the first powder and the second powder and maintaining a presence region of the third powder as pores (however, the second layer 300 has more porous portions because of the pores corresponding to the third powder). Further, by reducing the difference in the contraction rate between the first layer 310 and the second layer 300 in the sintering step, it is made possible to collectively sinter a three-dimensionally shaped object including a high-density portion (first layer 310) and a low-density portion (second layer 300).

To be noted, the average particle diameter of the third powder is preferably three times or larger the average particle diameter of the first powder and the second powder.

In addition, in the case where the first powder and the second powder are of different materials, the difference in the contraction rate between the first layer 310 and the second layer 300 in the sintering step can be reduced by matching the filling rate of the first powder in the first composition with the total filling rate of the second powder and the third powder in the second composition and determining the average particle diameter of the first powder and the average particle diameter of the second powder such that the relative density of the individually sintered body of the first powder and the relative density of the individually sintered body of the second powder are approximately equal. This is because, even in the case where the constituent materials (first powder and second powder) of the three-dimensionally shaped object 500 are different, the degree of contraction can be equalized by determining the average particle diameter of the first powder and the average particle diameter of the second powder such that the relative density of the individually sintered body of the first powder and the relative density of the individually sintered body of the second powder are approximately equal. Further, by reducing the difference in the contraction rate between the first layer 310 and the second layer 300 in the sintering step, it is made possible to collectively sinter a three-dimensionally shaped object including a high-density portion (first layer 310) and a low-density portion (second layer 300).

To be noted, "matching" and "approximately equal" refer to not only a case of being exactly the same but also a case of being substantially the same. Examples of these cases include a case where the difference in the filling rate is equal to or smaller than 3% (for example, 42% and 45%), a case where the difference in the average particle diameter is equal to or smaller than 20% (for example, 2 µm and 2.5 µm or 4 µm and 5 µm), and a case where the difference in the relative density is equal to or smaller than 2%. In addition, for example, d50 can be adopted as the "average particle diameter".

Here, a method of matching the filling rate of the first powder with the total filling rate of the second powder and the third powder and determining the average particle diameter of the first powder and the average particle diameter of the second powder such that the relative density of the individually sintered body of the first powder and the relative density of the individually sintered body of the second powder are approximately equal in the case where the first powder and the second powder are of different materials will be described in detail.

Figure 14:
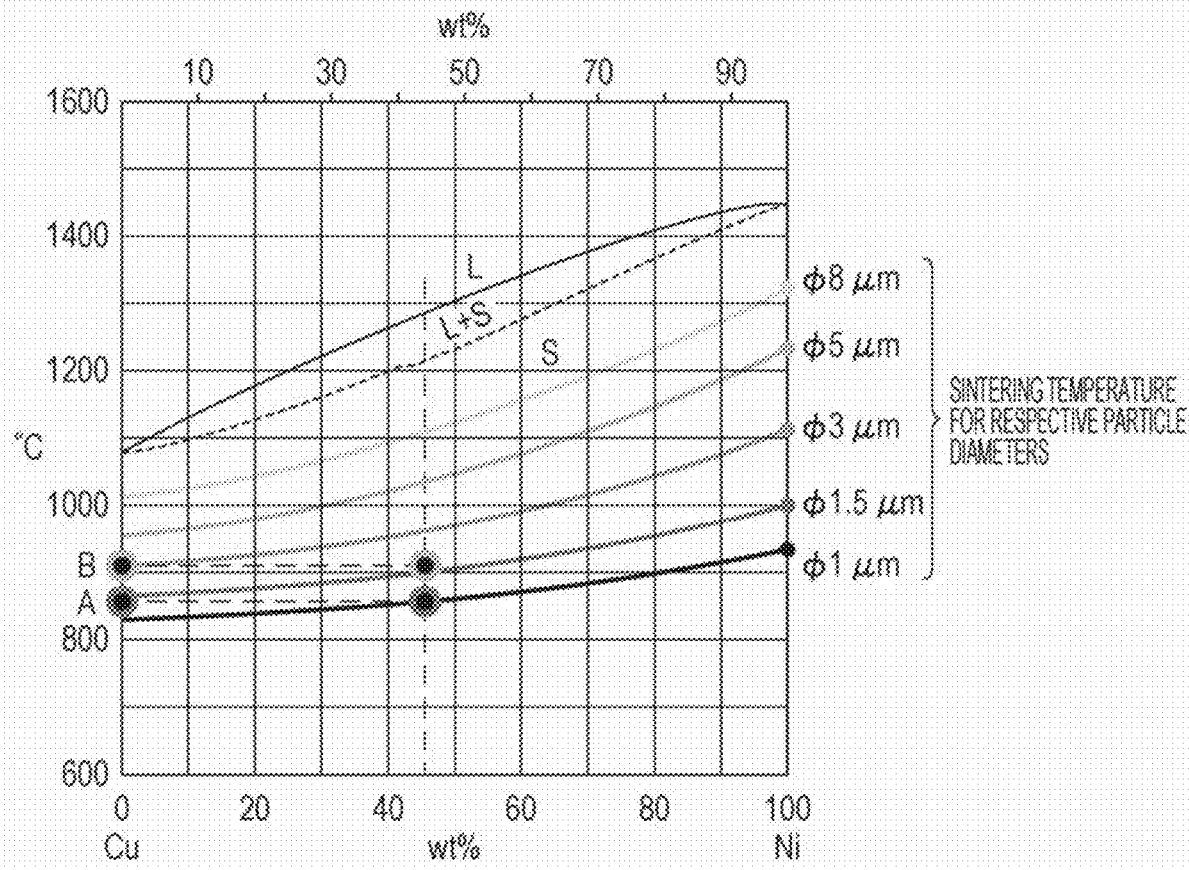
FIG. 14 is a diagram for describing a production example of a three-dimensionally shaped object according to an embodiment of the invention.

Here, FIG. 14 is a diagram for describing a production example of the three-dimensionally shaped object 500 that can be produced by the production method of a three-dimensionally shaped object of the present embodiment, and is a schematic diagram for determining the average particle diameter of the first powder and the average particle diameter of the second powder such that the relative density of the individually sintered body of the first powder and the relative density of the individually sintered body of the second powder are approximately equal, which has been obtained as a result intensive studies and experiments by the present inventors. FIG. 14 illustrates a phase diagram (illustrating a liquid phase L, a solid phase S, and a state including both of these) in the case where the first powder is copper (Cu) and the second powder is constantan (Cu—Ni alloy), and also illustrates sintering temperatures for respective average particle diameters. To be noted, in FIG. 14, the vertical axis represents temperature, and the horizontal axis represents a content ratio of Cu and Ni.

In the present production example, an example of determining the average particle diameter of the first powder and the average particle diameter of the second powder when the first powder is Cu and the second powder is a Cu—Ni alloy of Cu:Ni=45:55 (Cu—Ni(45-55)) will be described.

In addition, binder having a composition shown in Table 1 below was used for the first composition and the second Composition.

TABLE 1

| Component | Classification | vol (%) |
| --- | --- | --- |
| Low-molecular-weight polypropylene | Binding agent | 15 |
| Polystyrene (WAX) | Binding agent | 45 |
| Acrylic resin | Binding agent | 20 |
| Stearic acid | Moisturizing agent | 5 |
| Amino acid-based functional powder | Dispersing agent | 5 |
| Dioctyl phthalate | Plasticizer | 10 |

In the case where Cu powder having an average particle diameter of 1.5 µm is employed as the first powder (corresponding to 0 wt % in FIG. 14), the sintering temperature thereof is about 850° C. The average particle diameter of Cu—Ni(45-55) serving as the second powder corresponding to the sintering temperature of 850° C. is 1 µm as can be seen from FIG. 14 (see set A of FIG. 14).

In addition, in the case where Cu powder having an average particle diameter of 3 µm is employed as the first powder (corresponding to 0 wt % in FIG. 14), the sintering temperature thereof is about 900° C. The average particle diameter of Cu—Ni(45-55) serving as the second powder corresponding to the sintering temperature of 900° C. is 1.5 µm as can be seen from FIG. 14 (see set A of FIG. 14).

These can be summarized as shown in Table 2 below.

TABLE 2

| | Particle diameter of Cu | Particle diameter of Cu—Ni (45-55) |
| --- | --- | --- |
| Set A | 1.5 µm | 1 µm |
| Set B | 3 µm | 1.5 µm |

That is, the method of matching the filling rate of the first powder with the total filling rate of the second powder and the third powder and determining the average particle diameter of the first powder and the average particle diameter of the second powder such that the relative density of the individually sintered body of the first powder and the relative density of the individually sintered body of the second powder are approximately equal can be also referred to as a method of selecting average particle diameters such that the sintering temperatures of the first powder and the second powder match in the case where the first powder and the second powder are each constituted by a single kind of powder. This is because the occurrence of difference in the contraction rate between the first layer 310 and the second layer 300 can be suppressed by selecting the average particle diameters such that the sintering temperatures of the first powder and the second powder match.

To be noted, although the production example described above is an example in which the first powder is Cu and the second powder is constantan, in the case where different powders are used as the first powder and the second powder, a correlation diagram of the two corresponding to FIG. 14 can be created by repeatedly conducting experiments or the like, and the particle diameters of the first powder and the second powder can be determined in the same manner as described above in accordance with the correlation diagram.

Next, a specific example of the three-dimensionally shaped object 500 formed by the forming apparatus 2000 described above (production method of a three-dimensionally shaped object described above) will be described.

Figure 15:
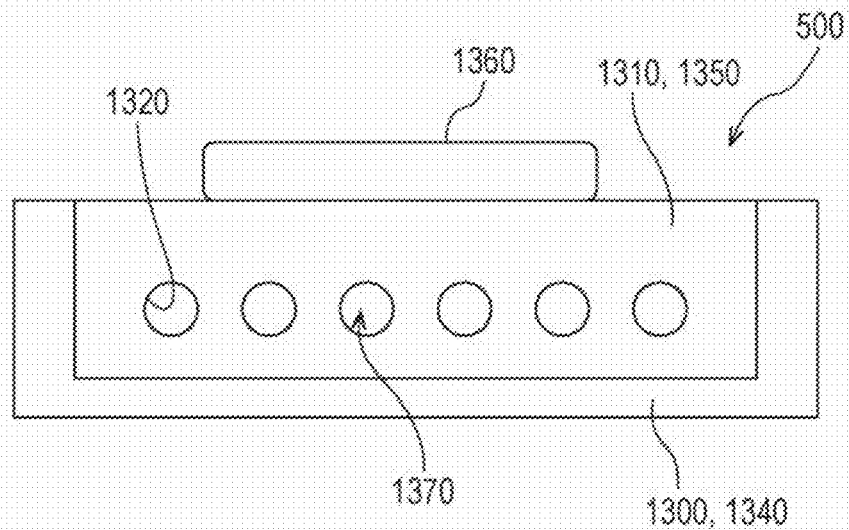
FIG. 15 is a schematic section view of a heat sink formed by using a production apparatus of a three-dimensionally shaped object according to an embodiment of the invention.
Figure 16:
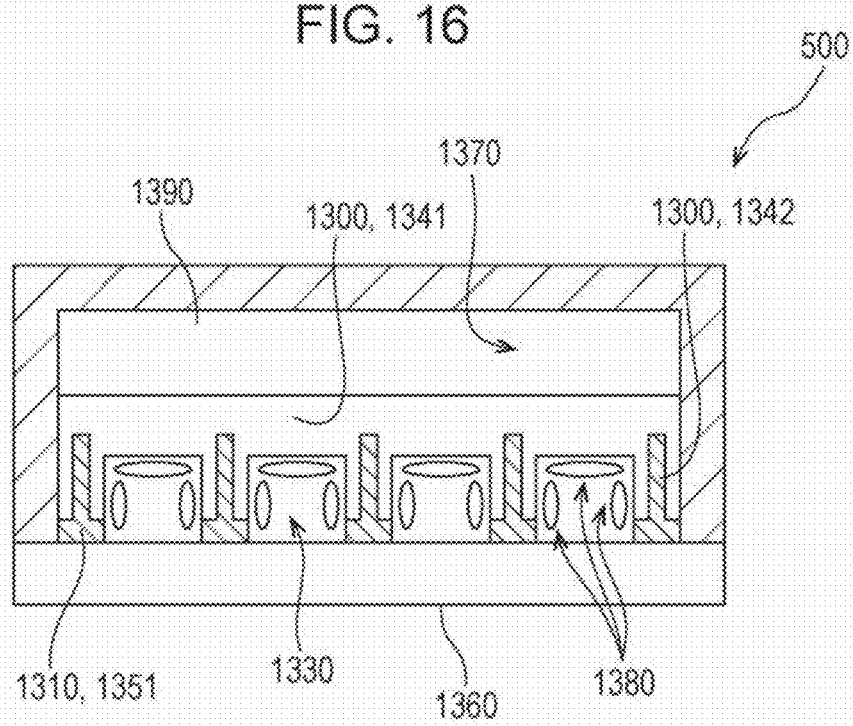
FIG. 16 is a schematic section view of a loop heat pipe formed by using a production apparatus of a three-dimensionally shaped object according to an embodiment of the invention.

Here, FIG. 15 is a schematic section view of a heat sink formed by the forming apparatus 2000 described above (production method of a three-dimensionally shaped object described above). In addition, FIG. 16 is a schematic section view of a loop heat pipe formed by the forming apparatus 2000 described above (production method of a three-dimensionally shaped object described above).

Example 1 (Corresponding to the Case where the First Powder and the Second Powder are of the Same Material)

A paste in which the average particle diameter (d50) of Cu serving as the first powder was 2.5 µm and the filling rate of the first powder was 45% was prepared as the first composition. In addition, a paste which contains the second powder and the third powder in a mass ratio of 1:1 and in which the average particle diameter (d50) of Cu serving as the second powder was 2.5 µm, the average particle diameter (d50) of PA12 (polyamide 12) serving as the third powder was 10 µm, and the total filling rate of the second powder and the third powder was 45% was prepared as the second composition. Then, the three-dimensionally shaped object 500 (heat sink) illustrated in FIG. 15 was formed by the forming apparatus 2000 (production method of a three-dimensionally shaped object described above) using the first composition and the second composition described above. Specifically, the first layer forming step and the second layer forming step were respectively performed by using the first composition and the second composition, and then the sintering step was performed at 950° C. As a result of this, contraction rates of a high-density portion 1310 that was a region corresponding to the first layer 310 and a low-density portion 1300 that was a region corresponding to the second layer 300 were equalized, and thus the three-dimensionally shaped object 500 (heat sink) without deformation was successfully formed as illustrated in FIG. 15.

Here, the relative density of the portion (high-density portion 1310) corresponding to the first layer 310 after the sintering step was 98%, and the relative density of the portion (low-density portion 1300) corresponding to the second layer 300 after the sintering step was 74%.

The heat sink (laminate of the three-dimensionally shaped object 500) illustrated in FIG. 15 has a configuration in which a cell structure portion 1340 constituted by the second layer 300 (low-density portion 1300) and pipe portions 1320 constituted by the first layer 310 (high-density portion 1310) are formed in the cell structure portion 1340. Further, the heat sink has a configuration in which a heat source 1360 such as a semiconductor chip is in contact with a contact portion 1350 constituted by the high-density portion 1310, and cooling water 1370 can be caused to flow in the pipe portions 1320. As described above, the cell structure portion 1340 has a low thermal conductivity as a result of being formed in a low density, and the portion (high-density portion 1310) corresponding to the first layer in which the pipe portions 1320 are formed has a high thermal conductivity as a result of being formed in a high density. Therefore, by performing the production method of a three-dimensionally shaped object described above and by employing the configuration in which, for example, the heat source 1360 is in contact with the portion corresponding to the first layer 310 and the pipe portions 1320 are cooled by flowing cooling water or the like in the pipe portions 1320 like the heat sink illustrated in FIG. 15, a heat sink of a high performance that can efficiently suppress transfer of heat from the cell structure portion 1340 (portion corresponding to the second layer 300) to the surroundings can be produced.

Example 2 (Corresponding to the Case where the First Powder and the Second Powder are of the Same Material)

The three-dimensionally shaped object 500 (loop heat pipe: LHP) illustrated in FIG. 16 was formed by the forming apparatus 2000 (production method of a three-dimensionally shaped object described above) using the first composition and the second composition of Example 1 described above. Specifically, the first layer forming step and the second layer forming step were respectively performed by using the first composition and the second composition, and then the sintering step was performed at 950° C. similarly to Example 1. As a result of this, contraction rates of the high-density portion 1310 that was a region corresponding to the first layer 310 and the low-density portion 1300 that was a region corresponding to the second layer 300 were equalized, and thus the three-dimensionally shaped object 500 (LHP) without deformation was successfully formed as illustrated in FIG. 16. To be noted, the relative densities of the high-density portion 1310 and the low-density portion 1300 after the sintering step were similar to Example 1.

The LHP (laminate of the three-dimensionally shaped object 500) illustrated in FIG. 16 has a configuration in which a base portion 1341 and columnar portions 1342 extending from the base portion 1341 are formed from the second layer 300 (low-density portion 1300), and shapes partially inserted in the columnar portions 1342 from the opposite side to the base portion 1341 are formed from the first layer 310 (high-density portion 1310). That is, the base portion 1341 has a low thermal conductivity as a result of being formed in a low density, the opposite side (portion corresponding to the first layer 310) to the base portion 1341 has a high thermal conductivity as a result of being formed in a high density (high-density portion 1310), and space portions 1330 are defined around the columnar portions 1342 in regions between the base portion 1341 and the opposite side to the base portion 1341. Further, the LHP has a configuration in which the heat source 1360 such as a semiconductor chip is in contact with contact portions 1351 constituted by the high-density portion 1310, and cooling water 1370 can be caused to flow in a pipe 1390 (loop-shaped pipe connected to an unillustrated cooling portion or the like) on the side of the base portion 1341 opposite to the space portion 1330. As described above in the present example, the base portion 1341 and the columnar portions 1342 have low thermal conductivities as a result of being formed in a low density, the portions (high-density portion 1310) corresponding to the first layer 310 partially inserted in the columnar portions 1342 from the opposite side to the base portion 1341 have high thermal conductivities as a result of being formed in a high density. Therefore, by performing the production method of a three-dimensionally shaped object described above and employing the configuration in which, for example, the heat source 1360 is in contact with the contact portions 1351 (portions corresponding to the first layer 310) on the opposite side to the base portion 1341 and the base portion 1341 is cooled by the cooling water 1370 or the like, like the LHP illustrated in FIG. 16, the LHP can have a configuration in which the cooling water 1370 is caused to permeate to the columnar portions 1342 side from the base portion 1341 corresponding to the second layer 300 while effectively suppressing transfer of heat to the base portion 1341 side and latent heat is absorbed by evaporating the cooling water 1370 into vapor 1380 (cooling the heat source 1360 by the heat of vaporization) in the space portions 1330 around the columnar portions 1342, and thus an LHP of high performance can be produced. To be noted, in the LHP illustrated in FIG. 16, the space portions 1330 have pipe shapes, through which the vapor 1380 passes, as a result of the combination of the columnar portions 1342 and the heat source 1360. Further, the direction in which the space portions 1330 extend and the pipe 1390 extends are both directions perpendicular to a sheet surface in FIG. 16.

Example 3 (Corresponding to the Case where the First Powder and the Second Powder are of Different Materials)

Instead of using the first composition and the second composition of Example 1 described above, powder different from Cu can be used as the first powder and the second powder.

For example, the first composition of Example 1 described above can be used as the first composition, and a paste which contains the second powder and the third powder in a mass ratio of 1:1 and in which the average particle diameter (d50) of Cu—Ni alloy serving as the second powder is 1.5 µm, the average particle diameter (d50) of PA12 (polyamide 12) serving as the third powder is 10 µm, and the total filling rate of the second powder and the third powder is 45% can be used. To be noted, in this example, the Cu—Ni alloy serving as the second powder and the PA12 serving as the third powder having average particle diameters calculated such that the relative density of the second layer 300 after the sintering step was 74% to achieve a ratio (first composition:second composition=98%:74%) of relative density of the first composition and the second composition similar to that of Example 1 after the sintering step were selected.

Example 4 (Corresponding to the Case where the First Powder and the Second Powder are of Different Materials)

For example, the first composition of Example 1 described above can be used as the first composition, and a paste which contains two kinds of powders of Cu and Ni as the second powder, in which the average particle diameter (d50) of Cu is 2.5 µm, the average particle diameter (d50) of Ni is 1 µm, and the average particle diameter (d50) of PA12 (polyamide 12) serving as the third powder is 10 µm, and which contains Cu, Ni, and PA12 in a mass ratio of 27.5: 22.5:50 can be used. To be noted, in this example, the Cu and Ni serving as the second powder and the PA12 serving as the third powder having average particle diameters calculated such that the relative density of the second layer 300 after the sintering step was 74% to achieve a ratio (first composition:second composition=98%:74%) of relative density of the first composition and the second composition similar to that of Example 1 after the sintering step were selected.

Other Examples (Corresponding to the Case where the First Powder and the Second Powder are of Different Materials)

In addition, while using Cu as the first powder, two kinds of powders of Cu—Ni alloy and Cu, two kinds of powders of Cu—Ni alloy and Ni, three kinds of powders of Cu—Ni alloy, Cu, and Ni, or the like can be used as the second powder. Furthermore, powder different from Cu such as $Al_2O_3$ and AlN can be also used as the first powder.

In addition, both of the case where the first powder and the second powder are of the same material and the case where the first powder and the second powder are of different materials may simultaneously hold in at least one of the lamination direction (Z direction) of the laminate and a crossing direction crossing the lamination direction.

In addition, the laminate of the three-dimensionally shaped object 500 may be formed such that the presence ratio of the first layer 310 and the second layer 300 varies in at least one of the lamination direction (Z direction) of the layers 501, 502, 503, . . . 50n and the crossing direction crossing the lamination direction. This is because the laminate is formed such that the presence ratio of the first layer 310 and the second layer 300 varies in at least one of the lamination direction and the crossing direction, and thus gradient of thermal conductivity can be generated in the laminate in accordance with the application or the like of the three-dimensionally shaped object 500.

The invention is not limited to the examples described above, and can be implemented in various configurations within the gist thereof. For example, technical features of the examples corresponding to technical features of respective aspects described in the summary may be appropriately replaced or combined to solve part or all of the problems described above or achieve part or all of the effects described above. In addition, the technical features can be appropriately deleted unless the technical features are described as necessary in the specification.

What is claimed is:

1. A production method for producing a three-dimensionally shaped object by laminating layers, the production method comprising:
    forming a first layer among the layers by using a first composition containing a first powder and a binder;
    forming a second layer among the layers by using a second composition containing a second powder, a third powder, and a binder, the third powder being an organic material; and
    collectively sintering the first powder and the second powder by heating a laminate including the first layer and the second layer,
    wherein the first powder and the second powder are made of the same material, and wherein a difference in a contraction rate between the first layer and the second layer during the sintering is reduced by matching a filling rate of the first powder in the first composition with a total filling rate of the second powder and the third powder in the second composition and matching an average particle diameter of the first powder with an average particle diameter of the second powder.

2. The production method of a three-dimensionally shaped object according to claim 1, wherein a cell structure portion constituted by the second layer is formed in the laminate, and a pipe portion constituted by the first layer is formed in the cell structure portion.

3. The production method of a three-dimensionally shaped object according to claim 1, wherein, in the laminate, a base portion and a columnar portion extending from the base portion are formed from the second layer, and a shape partially inserted in the columnar portion from an opposite side to the base portion is formed from the first layer.

4. The production method of a three-dimensionally shaped object according to claim 1, wherein the laminate is formed such that a presence ratio of the first layer and the second layer varies in at least one of a lamination direction of the first layer and the second layer and a crossing direction crossing the lamination direction.

5. A production method for producing a three-dimensionally shaped object by laminating layers, the production method comprising:

forming a first layer among the layers by using a first composition containing a first powder and a binder;

forming a second layer among the layers by using a second composition containing a second powder, a third powder, and a binder, the third powder being an organic material; and collectively sintering the first powder and the second powder by heating a laminate including the first layer and the second layer, wherein the first powder and the second powder are made of different materials, and wherein a difference in a contraction rate between the first layer and the second layer during the sintering is reduced by matching a filling rate of the first powder in the first composition with a total filling rate of the second powder and the third powder in the second composition and using an average particle diameter of the first powder and an average particle diameter of the second powder such that a relative density of an individually sintered body of the first powder and a relative density of an individually sintered body of the second powder are approximately equal.

* * * * *